United States Patent
Bryant et al.

(10) Patent No.: US 6,724,558 B2
(45) Date of Patent: Apr. 20, 2004

(54) SERVO WRITING IN A DISC DRIVE WITH SUBSTANTIALLY IDENTICAL HEADS HAVING READ AND WRITE ELEMENTS IN A RADIAL OFFSET POSITION

(75) Inventors: Lawrence Matthias Bryant, Palo Alto, CA (US); Karl Arnold Belser, San Jose, CA (US); Robert Dale Murphy, Boulder, CO (US)

(73) Assignee: JPMorgan Chase Bank, New York, NY (US)

( * ) Notice: Subject to any disclaimer, the term of this patent is extended or adjusted under 35 U.S.C. 154(b) by 426 days.

(21) Appl. No.: 09/772,578

(22) Filed: Jan. 30, 2001

(65) Prior Publication Data

US 2001/0033450 A1 Oct. 25, 2001

Related U.S. Application Data

(60) Provisional application No. 60/198,197, filed on Apr. 19, 2000.

(51) Int. Cl.$^7$ .................................................. G11B 5/596
(52) U.S. Cl. ..................................... 360/75; 360/78.08
(58) Field of Search ............................. 360/75, 77.08, 360/51, 53, 48, 235.1–235.4, 63

(56) References Cited

U.S. PATENT DOCUMENTS

| | | | |
|---|---|---|---|
| 4,414,589 A | 11/1983 | Oliver et al. ................. 360/77 |
| 4,933,795 A | 6/1990 | Nigam | |
| 5,010,430 A | * 4/1991 | Yamada et al. ........... 360/235.4 |
| 5,404,255 A | 4/1995 | Kobayashi et al. | |
| 5,457,586 A | 10/1995 | Solhjell | |
| 5,473,550 A | 12/1995 | Cameron et al. | |
| 5,485,322 A | * 1/1996 | Chainer et al. ............... 360/51 |
| 5,570,332 A | 10/1996 | Heath et al. | |
| 5,640,755 A | 6/1997 | Kubota et al. | |
| 5,760,990 A | 6/1998 | Ukani et al. | |
| 5,774,294 A | 6/1998 | Fioravanti | |
| 5,777,816 A | 7/1998 | Hampshire et al. | |
| 5,793,555 A | 8/1998 | Belser et al. | |
| 5,801,908 A | * 9/1998 | Akiyama et al. ........ 360/294.4 |
| 5,835,300 A | 11/1998 | Murphy et al. | |
| 5,844,675 A | 12/1998 | Hayes et al. | |
| 5,867,353 A | 2/1999 | Valent | |
| 5,940,240 A | 8/1999 | Kupferman | |
| 5,946,158 A | 8/1999 | Nazarian et al. | |
| 5,982,173 A | 11/1999 | Hagen | |
| 6,031,684 A | 2/2000 | Gregg | |
| 6,034,837 A | 3/2000 | Purkett ......................... 360/78 |
| 6,067,204 A | 5/2000 | Tremaine | |
| 6,078,447 A | 6/2000 | Sim ............................. 360/48 |
| 6,078,458 A | 6/2000 | Fioravanti et al. | |
| 6,091,567 A | 7/2000 | Cooper et al. | |
| 6,108,158 A | * 8/2000 | Katayama et al. ....... 360/77.04 |
| 6,259,576 B1 | * 7/2001 | Ahn ............................. 360/75 |
| 6,359,753 B1 | * 3/2002 | Osaka et al. .............. 360/235.4 |
| 6,373,648 B2 | * 4/2002 | O'Connor .................... 360/63 |
| 6,522,494 B1 | * 2/2003 | Magee ......................... 360/75 |

* cited by examiner

*Primary Examiner*—David Hudspeth
*Assistant Examiner*—K. Wong
(74) *Attorney, Agent, or Firm*—Merchant & Gould PC

(57) ABSTRACT

A method and apparatus for reading and writing data from and to a data storage disc in a data storage device. The data storage disc includes a first disc surface and second disc surface for storing data. The data storage device includes an actuator assembly configured to selectively position a first transducer over the first disc surface and a second transducer over the second disc surface, wherein the first transducer is substantially identical to the second transducer. Furthermore, each transducer includes a read element and a write element, wherein the read element is offset from the write element by at least the width of one servo track.

16 Claims, 6 Drawing Sheets

SERVO WRITING IN A DISC DRIVE WITH SUBSTANTIALLY IDENTICAL HEADS HAVING READ AND WRITE ELEMENTS IN A RADIAL OFFSET POSITION

RELATED APPLICATION

This application claims priority of U.S. provisional application Ser. No. 60/198,197 filed Apr. 19, 2000.

FIELD OF THE INVENTION

The present invention relates to writing servo track information on magnetic disc drives, and more specifically to propagating servo tracks using an actuator assembly with substantially identical data transducers.

BACKGROUND OF THE INVENTION

Disc drives are among the most common means of storing electronic information in use today. Ordinary disc drives are typically constructed with the following internal components: one or more magnetic media discs attached to a spindle; a spindle motor that rotates the spindle and the attached discs at a constant high speed; an actuator assembly, located adjacent to the discs, with a plurality of actuator arms that extend over the discs, each with one or more flexures extending from the end of each actuator arm, and with a transducer head (also referred to as a "head," "read/write head," or "slider") mounted at the distal end of each flexure; and a servo positioner that rotates the actuator assembly about a bearing shaft assembly positioned adjacent to the discs such that the transducer heads radially traverse the disc surface (i.e. move back and forth the between the inner and outer diameters of the disc).

Information is stored on and retrieved from a magnetizable material on the disc's surface. Typically, both the top and bottom surfaces of each disc are utilized to store and retrieve information. Information is transferred to and from a disc surface by a transducer head attached to a flexure at the end of the actuator arm. Each transducer head normally includes an air-bearing slider that enables the transducer to fly on a cushion of air in close proximity to the corresponding surface of the associated disc. Most transducers have a write transducer element and a read transducer element. The write element is used to store information to the disc, whereas the read element is used to retrieve information from the disc.

To facilitate information storage and retrieval, discs are radially divided in concentric circles known as "servo tracks" or "tracks." The tracks are given a track number so that the servo positioner can locate a specific track. The servo positioner, upon receiving a control command, aligns the transducer head over the desired track. Information can be stored or retrieved from the disc once the transducer head is in the correct position. The process of switching between different tracks is called "seeking," whereas remaining over a single track while information is stored or retrieved is called "following."

Each track is subdivided into pie-shaped sections called "segments" or "sectors." The two most common types of sectors are informational data sectors and servo data sectors. In a typical disc drive, the informational data sectors usually contain information generated or stored by the user such as programs files, application files, or database files. There may be as few as ten or as many as thousands of informational data sectors dispersed around a single track.

The servo data sectors, on the other hand, contain information that is used by the servo positioner to determine the radial position of the head relative to the disc surface and relative to the track center. Servo sectors typically consist of a Grey code field which provides coarse position information, such as the track and cylinder number, and a servo burst field which provides fine position information, such as the relative position of the transducer head to the track center. Generally the burst fields are used to create a positive voltage on one side of the track centerline and a negative voltage on the other side of the track centerline. A read element on the transducer head can be aligned directly over the centerline by positioning the read element such that the sum of the burst field voltages equal zero.

Servo sectors are usually placed between adjacent informational data sectors on the same track. A clock signal mechanism is used to insure that data intended to be stored in a servo sector does not overwrite data in an information sector (and vice versa).

The number of tracks located within a specific area of the disc is called the "track density." The greater the number of tracks per area, the greater the track density. The track density may vary as the disc is radially traversed. Disc manufacturers attempt to increase track density in order to place more information on a constant size disc. Track density may be increased by either decreasing the track width or by decreasing the spacing between adjacent tracks.

An increase in track density necessitates increased positioning accuracy of the read/write transducer elements in order to prevent data from being read from or written to the wrong track. Manufacturers attempt to position the read/write transducer elements directly over the center of the desired track (sometimes referred to as the "null error position") when a read/write operation occurs to insure that the information is being read from and written to the correct track. Closely following the track center position at high track densities requires that the tracks be as close to perfectly circular as possible when written to the disc surface.

Tracks are usually written on the disc during manufacturing using one of two means: 1) a servowriting machine, or 2) self-propagated servo writing. In both methods, a timing clock is used to notify the servo positioner when the transducer is over an area where a servo sector is to be written. A write enable signal is activated and servo information is written when the timing pulse indicates that the head is located over a servo sector. The write enable signal is de-activated and information is not written once the head exits the area where a servo sector is to be written.

A servowriting machine is a piece of external equipment that writes servo tracks on a disc drive. The servowriting machine uses a relatively large, very accurate and relatively expensive positioning system which connects to the actuator assembly within the disc drive to precisely align a write element in the drive. The write element is aligned to where the desired track is to be written on the disc surface. A track is written on the disc once the write transducer element is correctly aligned. The servowriter positioning system then moves the write element a predetermined distance to the next desired track location. The servowriter positioning system, therefore, controls both the track placement and track-to-track spacing. There may be several actuator arms with several heads and several write elements attached which will write several tracks at each track location. In this case each track would be written on one side of each of several discs thereby writing a group of tracks or a cylinder of tracks at one time.

Utilizing a conventional servowriter for writing servo tracks has several drawbacks. First, a typical disc may contain tens or hundreds of thousands of servo tracks. The process of aligning and writing each track on the disc is very time consuming and expensive. Second, although very accurate at lower track densities, the servowriter cannot meet the accuracy requirements dictated by ever increasing track densities. Finally, the servowriting procedure must be completed in a clean room because internal disc drive components are exposed during servowriting, again adding expense to the procedure.

A second means of writing tracks on a disc is called self-propagating servo writing. Oliver et al first described this method of servo track writing in U.S. Pat. No. 4,414, 589. Several other patents have disclosed slight variations in the Oliver patent, but the same basic approach is used. Under the basic method, the drive's actuator arm is positioned at one of its mechanical travel range limit stops. A first reference track is written with the write transducer element. The first reference track is then read with the read transducer element as the transducer is radially displaced from the first reference track. When a distance is reached such that the read element senses a predetermined percentage of the first reference track's amplitude, a second reference track is written. The predetermined percentage is called the "reduction number." For example, the read element senses 100% of the first reference track's amplitude when the read element is directly over the first reference track. If the reduction number is 40%, the transducer is radially displaced from the first reference track until the read element senses only 40% of the first reference track's amplitude. A second reference pattern is written to the disc once the read element senses the 40% amplitude. The transducer is then displaced in the same direction until the read element senses 40% of the second reference track's amplitude. A third reference track is then written and the process continues. The process ends when the actuator arm's second limit stop is reached and the entire disc surface is filled with reference tracks. The average track density is then calculated using the number of tracks written and the length of travel of the transducer.

If the average track density is too high, the disc is erased, the reduction number is lowered so that a larger displacement occurs between tracks, and the process is repeated. If the track density is too low, the disc is erased, the reduction number is increased so that a smaller displacement occurs between tracks, and the process is repeated. If the track density is within the desired range, the reduction number for the desired average track density has been determined, the disc is erased, and servo tracks are written to the disc by alternatively writing servo and reference tracks. The servo tracks are further divided by alternatively writing servo and informational sectors.

Some self-propagating servo writing processes require the read transducer element to be radially offset from the write transducer element so that the read element can sense a reference track's amplitude without the write element overwriting the reference track. Moreover, the servo tracks must be propagated in the direction of the reader-to-writer offset since the read element must always read previously written servo tracks. In other words, the read element always follows the write element. As a result, current methods of self-propagating servo writing require using different top-surface transducers and bottom-surface transducers since each disc surface requires a read element which follows the write element.

Manufacturing two sets of transducer heads (a top-surface transducer and a bottom-surface transducer) generally complicates the disc drive production process and increases disc drive costs. Each transducer head set must be constructed separately using its own series of masks and redicals during fabrication. In addition, each transducer head set requires its own test platform and may yield different quantities of passing transducers. Thus, maintaining separate lots of top and bottom transducer heads adds expense to the disc drive manufacturing process.

SUMMARY OF THE INVENTION

In accordance with the present invention, the above and other problems are solved by providing a structure adapted to use substantially identical transducer heads in upward-facing and downward-facing positions. In this manner, only one type of transducer head need be fabricated, tested, and assembled for disc drives employing self-propagating servo writing. "Substantially identical" heads, as used herein, refer to those with magnetic field force or sense properties and electrically operative contacts in the same nominal location as one another. More particularly, a head is not "substantially identical" with its mirror image unless it is bilaterally symmetric.

The present invention generally involves a data storage device comprising a data storage disc having a first disc surface and second disc surface. The data storage device also includes an actuator assembly configured to selectively position a first transducer over the first disc surface and a second transducer over the second disc surface.

In a preferred embodiment, an actuator assembly exchanges data from and to a data storage disc, with the data storage disc having an inner diameter, a first disc surface and a second disc surface. The actuator assembly comprises a first transducer coupled with the actuator assembly. A first read element is mounted on the first transducer, with the first read element configured to read data from the first disc surface. A first write element is also mounted on the first transducer, with the first write element configured to write data to the first disc surface. In addition, the first read element is offset from the first write element by at least the width of one servo track, and the first read element is positioned closer to the inner diameter than the first write element when the first transducer is over the first disc surface. The actuator assembly further includes a second transducer coupled with the actuator assembly. A second read element is mounted on the second transducer, with the second read element configured to read data from the second disc surface. A second write element is also mounted on the second transducer and is configured to write data to the second disc surface. The second read element is offset from the second write element by at least the width of one servo track. Furthermore, the second write element is positioned closer to the inner diameter than the second read element when the second transducer is over the second disc surface.

Yet another embodiment of the invention includes a method for writing servo tracks on a data storage disc having a first surface and a second surface, wherein the first surface and the second surface are bounded by an inner diameter and an outer diameter. The method includes a propagating operation for propagating a first servo seed track pattern radially along the first disc surface from a first start position to a first end position in a first direction. Another propagating operation for propagating a second servo seed track pattern along the second disc surface from a second start position to a second end position in a second direction opposite to the first direction is then performed.

In another embodiment, the present invention optionally includes a disc drive including a data disc with a first disc surface and a second disc surface, where the data disc has at least one servo seed track pattern. The disc drive further includes means for propagating the servo seed track pattern along the first disc surface in a first direction and propagating the servo seed track pattern along the second disc surface in a second direction opposite the first direction.

These and various other features as well as advantages, which characterize the present invention, will be apparent from a reading of the following detailed description and a review of the associated drawings.

DETAILED DESCRIPTION

Figure 1:
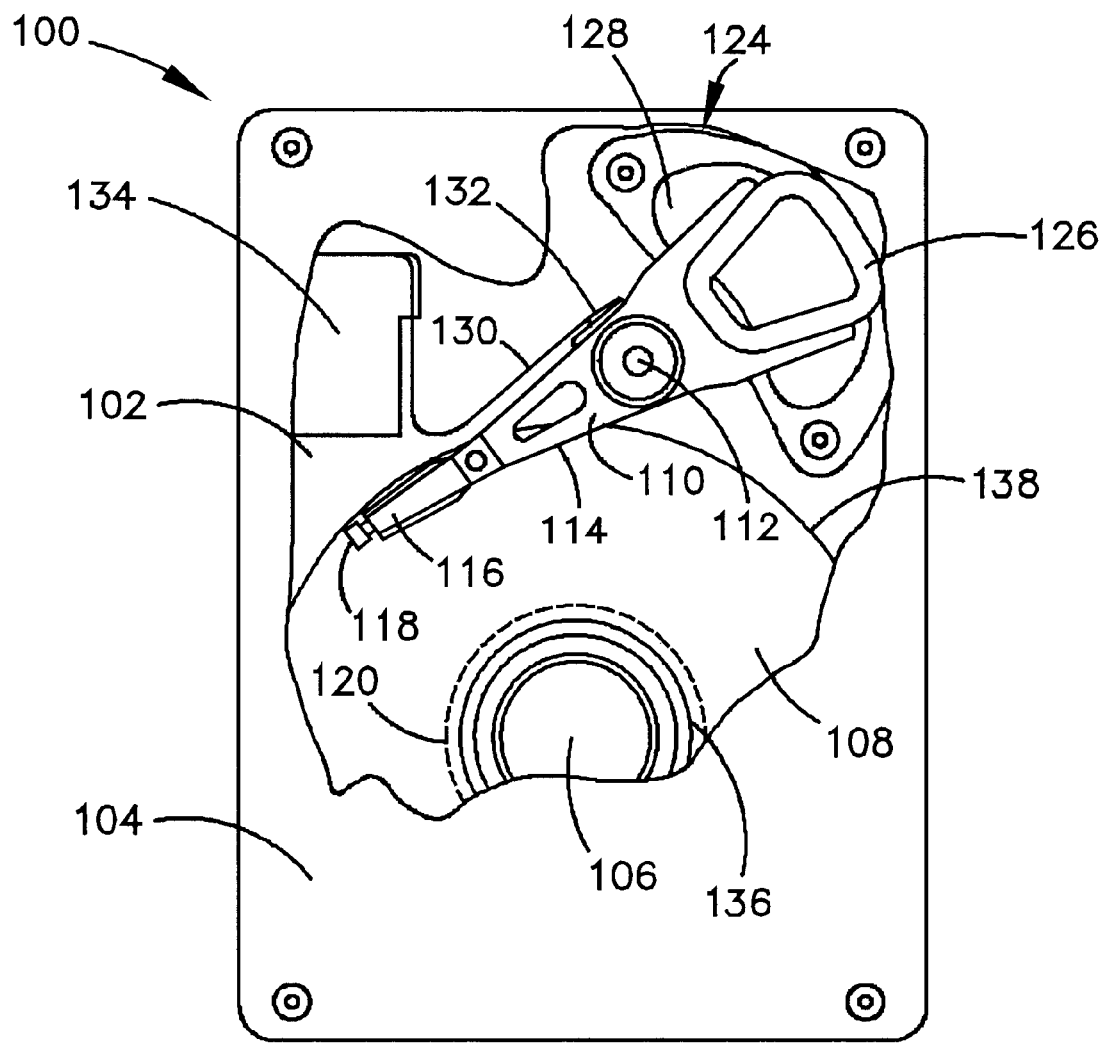
FIG. 1 is a plan view of a disc drive constructed in accordance with an embodiment of the present invention.

The invention is described in detail below with reference to the figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more data storage discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118 which includes an air-bearing slider enabling the transducer head 118 to fly in close proximity above the corresponding surface of the associated disc 108.

During a seek operation, the track position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the transducer heads 118 are caused to move across the surfaces of the discs 108.

The spindle motor 106 is typically de-energized when the disc drive 100 is not in use for extended periods of time. The transducer heads 118 are typically moved over park zones 120 near the inner diameter 136 of the discs 108 when the drive motor is de-energized. The transducer heads 118 are secured over the park zones 120 through the use of an actuator latch arrangement, which prevents inadvertent rotation of the actuator assembly 110 when the heads are parked. Alternatively, ramps (not shown) near the outer diameter 138 may be used to lift the transducer heads 118 away from the disc surface.

A flex assembly 130 provides the requisite electrical connection paths for the actuator assembly 110 while allowing pivotal movement of the actuator assembly 110 during operation. The flex assembly includes a preamplifier printed circuit board 132 to which head wires (not shown) are connected; the head wires being routed along the actuator arms 114 and the flexures 116 to the transducer heads 118. The printed circuit board 132 typically includes circuitry for controlling the write currents applied to the transducer heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
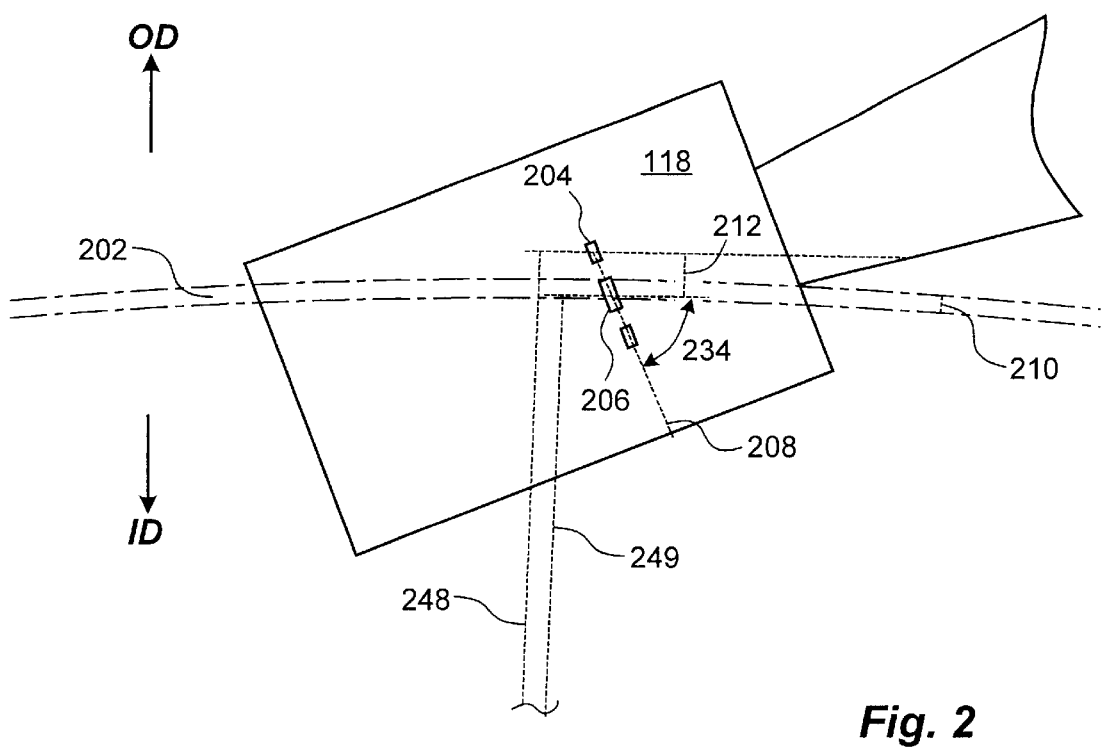
FIG. 2 shows a representation of a transducer head contemplated by the present invention over a servo track.

In FIG. 2, a representation of a transducer head 118 over a servo track 202 in accordance with the present invention is shown. The transducer head 118 is used to read and write information to and from the disc 108, and includes a read element 204 and a write element 206. In a particular embodiment of the present invention, the read element 204 is a magneto resistive (MR) sensor and the write element 206 is an inductive coil. It should be noted, however, that other types of read and write elements known to those skilled in the art, such as thin film read/write elements, are encompassed by the present invention.

As shown, the read element 204 and the write element 206 are connected (through their respective centers) by offset line 208. A radius 249 has a length equal to the offset between the disc's axis of rotation (at 106 of FIG. 1) to the center of the write element 206. Another radius 248 has a length equal to the offset between the disc's axis of rotation to the center of the write element 204. The difference 212 between the two radii 248,249 is desirably equal to the width 210 of several servo tracks 202. The acute angle 234 between the offset line and the tracks 202 is called the "reader writer offset skew angle," and is desirably greater than about 5 degrees.

Figure 3:
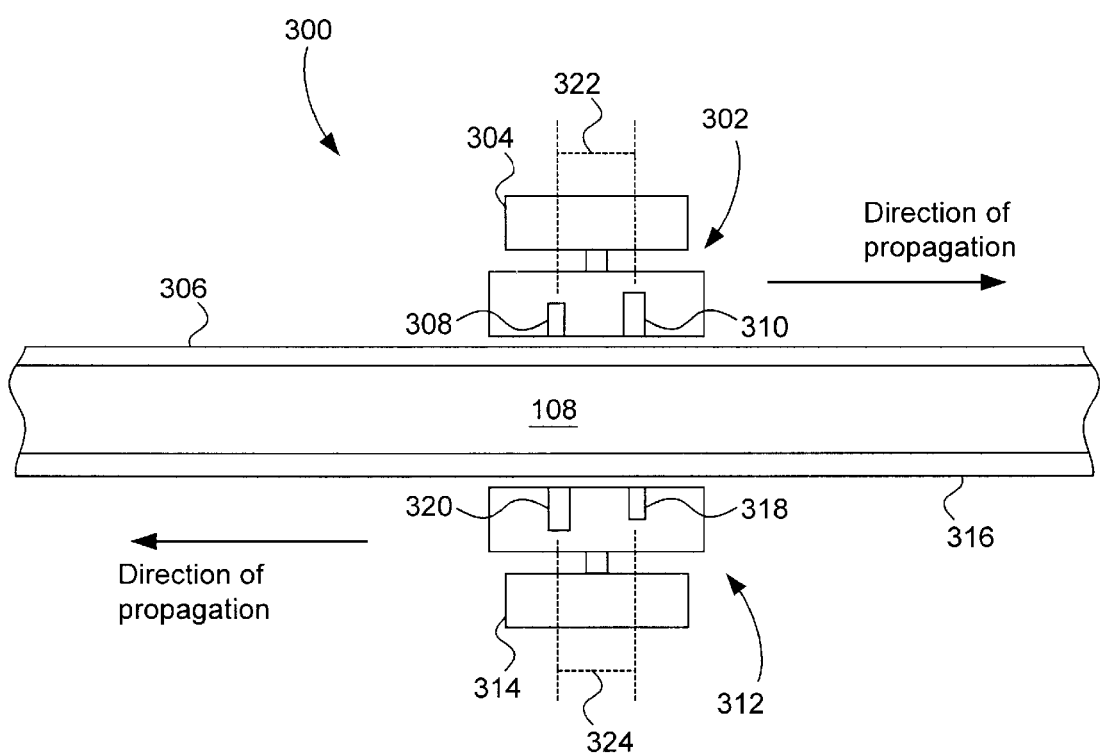
FIG. 3 shows a transducer assembly of the present invention proximate top and bottom surfaces of a data storage disc.

In FIG. 3, a transducer assembly 300 of the present invention is shown proximate the top and bottom surfaces of a data storage disc 108. A first transducer head 302 is coupled with the actuator assembly 110 by a first flexure 304, and is associated with a first disc surface 306. The first transducer head 302 includes a first read element 308 and a first write element 310 for reading and writing data from and to the first disc surface 306. Similarly, a second transducer head 312 is coupled with the actuator assembly 110 by a second flexure 314, and is associated with a second disc surface 316. The second transducer head 312 includes a second read element 318 and a second write element 320 for reading and writing data from and to the second disc surface 316.

In accordance with the present invention, the first transducer head 302 is substantially identical to the second transducer head 312. Thus the same fabricating, testing, and assembly processes can be utilized for both the first and second transducer heads 302 and 312. By providing an actuator assembly for self-propagating servo writing with substantially identical transducer heads, transducer head manufacturing is generally simplified and production costs are typically lowered.

Since the first transducer head 302 and the second transducer head 312 are substantially identical, the transducer offset 322 of the first transducer head 302 is substantially equal to the transducer offset 324 of the second transducer head 312. In particular, when mounted on opposite surfaces of the disc 108, the first read element 308 is positioned closer to the inner diameter 136 than the first write element 310 when the first transducer 302 is over the first disc surface 306, while the second write element 320 is positioned closer to the inner diameter 136 than the second read element 308 when the second transducer 312 is over the second disc surface 316.

As discussed previously, propagating servo tracks along a data disc typically requires that the read element follow the write element as the transducer head is moved radially along the disc. Accordingly, one embodiment of the present invention entails propagating servo tracks on the first disc surface 306 in an opposite direction to that of the second disc surface 316. For example, the first transducer head 302 propagates servo tracks from left to right with respect to FIG. 3, and the second transducer head 312 propagates servo tracks from right to left with respect to FIG. 3. Thus, the first and second read elements 308 and 318 follow the first and second write elements 310 and 320, respectively, during self-propagating servo writing.

Figure 4:
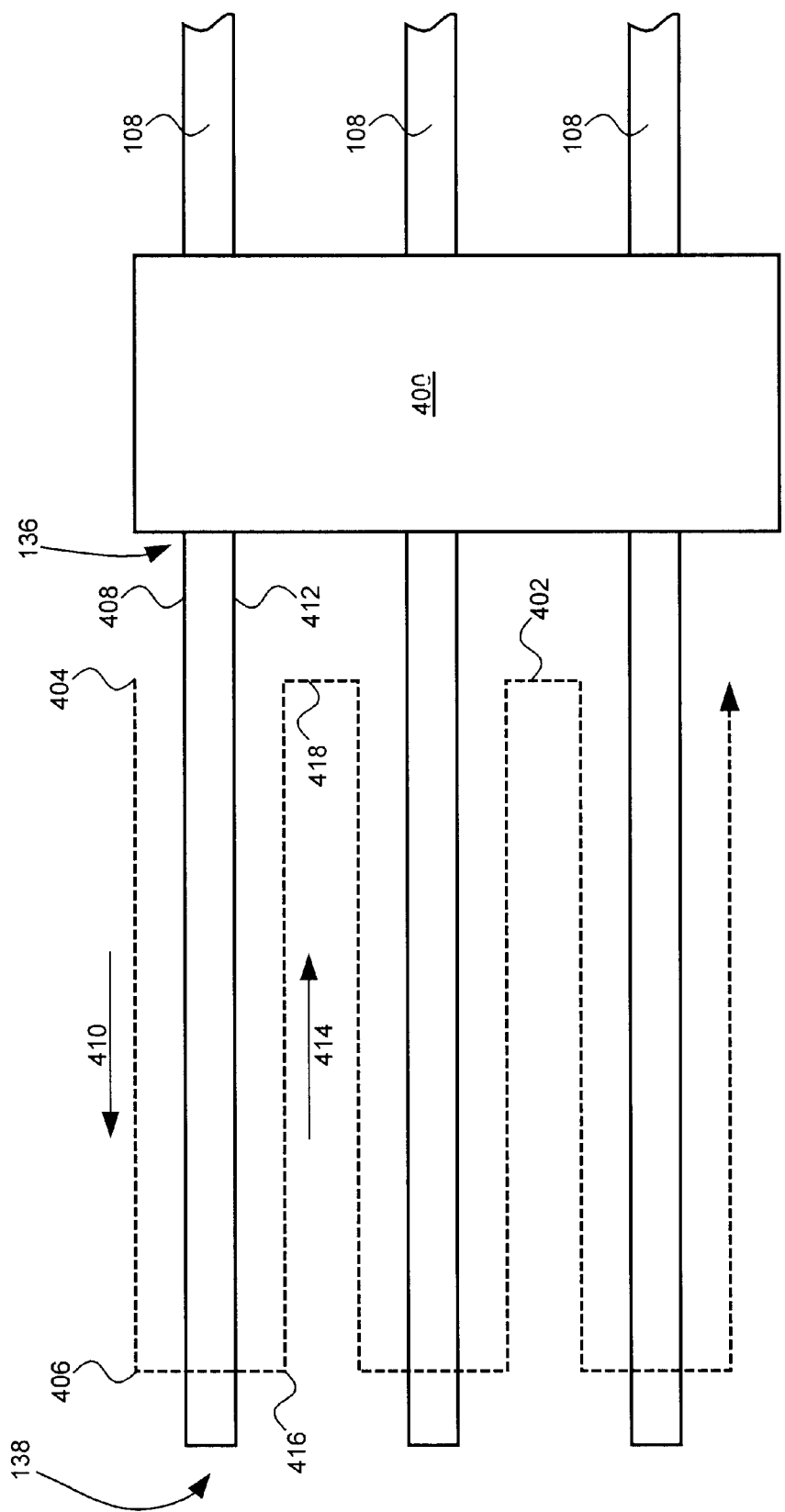
FIG. 4 shows a servo propagation path along a number of data storage discs as contemplated by the present invention.

FIG. 4 shows a number of data storage discs 108 mounted on a spindle 400. In one embodiment of the present invention, actuator assembly movement during servo track propagation is conducted in a substantially serpentine pattern. The propagation path 402 proceeds radially from a first start position 404 to a first end position 406 along a first surface 408 of a data disc 108 in a first direction 410. For example, the propagation path 402, as depicted in FIG. 4, begins at start position 404 proximate the inner diameter 136 and runs along the top surface 408 of the disc 108 to the end position 406 proximate the outer diameter 138 of the disc 108. The end position 406 may be the location where a predetermined number of servo tracks are written, a travel limit is reached, or the transducer moves off the disc surface.

Upon reaching the end position 406 over the first surface 408, the propagation path 402 proceeds radially inward along a second surface 412 of the data disc 108. Thus, servo propagation moves in a second direction 414 opposite the first direction 410 from second start position 416 to a second end position 418. In a particular embodiment of the present invention, the first end position 406 is used as a reference point to obtain the second start position 416. In other words, the read element associated with the first disc surface 408 is utilized to find the second start position 416 along the second disc surface 412.

Servo track propagation is continued along the propagation path 402 until all the discs 108 are formatted with servo tracks. It should be noted that the propagation path 402 may begin at the outer diameter 138 rather than the inner diameter 136.

Figure 5:
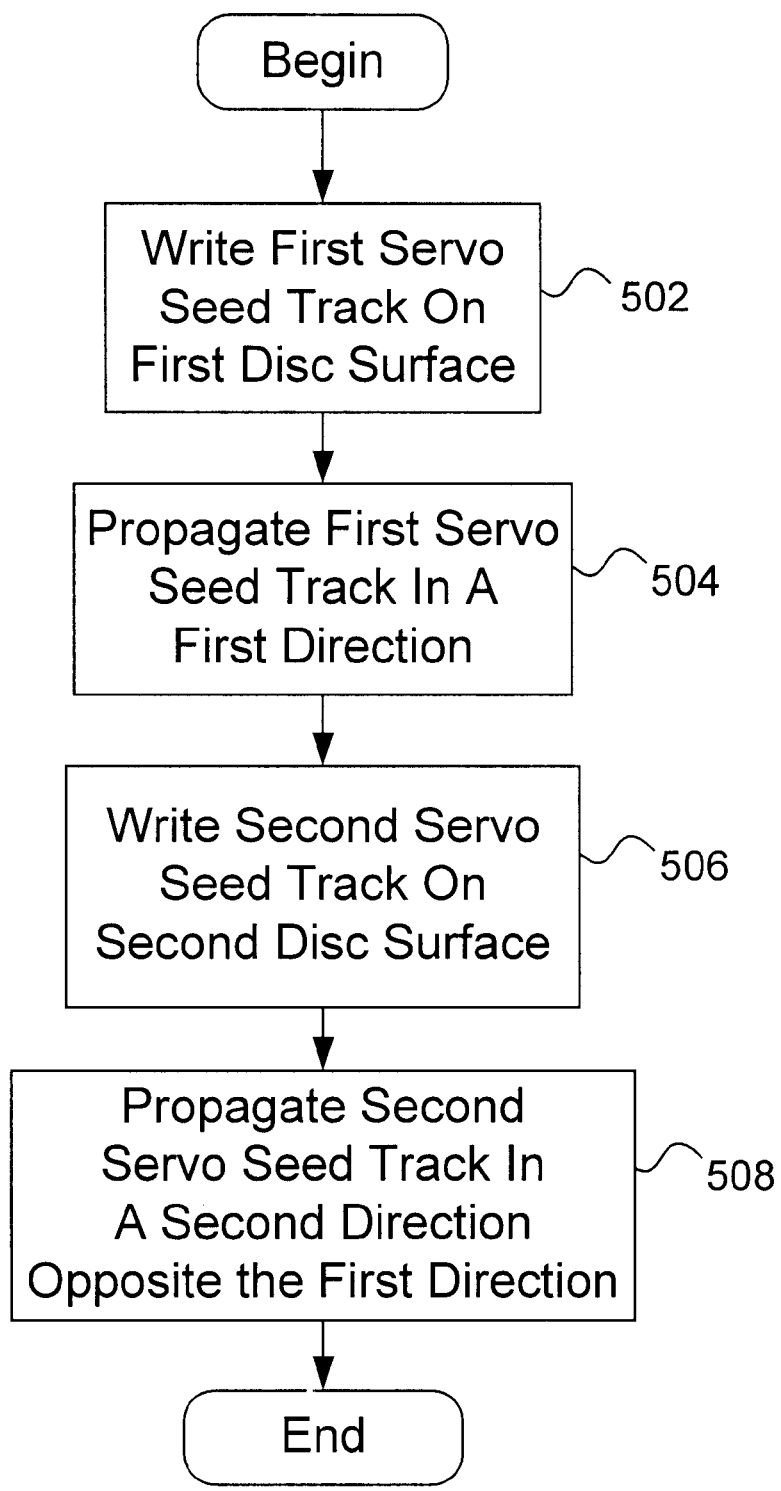
FIG. 5 shows an operational flow diagram of the present invention for propagating servo tracks.

In FIG. 5, an operational flow diagram of one embodiment of the present invention is shown. Operational flow begins with writing operation 502 where a first servo seed track or a series of several seed tracks on a first disc surface is written. The position of the first servo seed track or series of tracks delineates the beginning of the propagation path. As described earlier, the propagation path may begin at an outer diameter or an inner diameter of either a top surface or a bottom surface of a disc. Upon completion of writing operation 502, the operational flow then continues to propagating operation 504.

In propagating operation 504, the first servo seed track series are propagated radially along the first disc surface from a first start position to a first end position in a first direction. As described previously, and well known in the art, propagating a servo track entails successively repositioning the transducer head radially along the disc surface while copying disc servo tracks along the disc. The servo tracks are continually propagated until a first end position is reached. The first end position may be the location where a fixed number of servo tracks is written, a travel limit is reached, or the transducer moves off the disc surface.

Next, at writing operation 506, a second servo seed track series is written on a second disc surface. The second servo seed track marks the beginning of a second propagation path having a second direction opposite the first direction. Thus, if the first servo seed track is written proximate the inner diameter on the first disc surface, the second servo seed track is preferably written proximate the outer diameter of the second disc surface. As mentioned earlier, the location of the second servo seed track may be based on the end position of the first propagation path on the first disc surface.

Next, at propagating operation 508, the second servo seed track is propagated along the second disc surface in a second direction opposite the first direction. In this manner servo tracks are written to both surfaces of a data disc (i.e. a top surface and a bottom surface). After all the discs within the disc drive are configured with servo tracks in the manner described above, the servo writing procedure ends and user data may be written on the discs.

Figure 6:
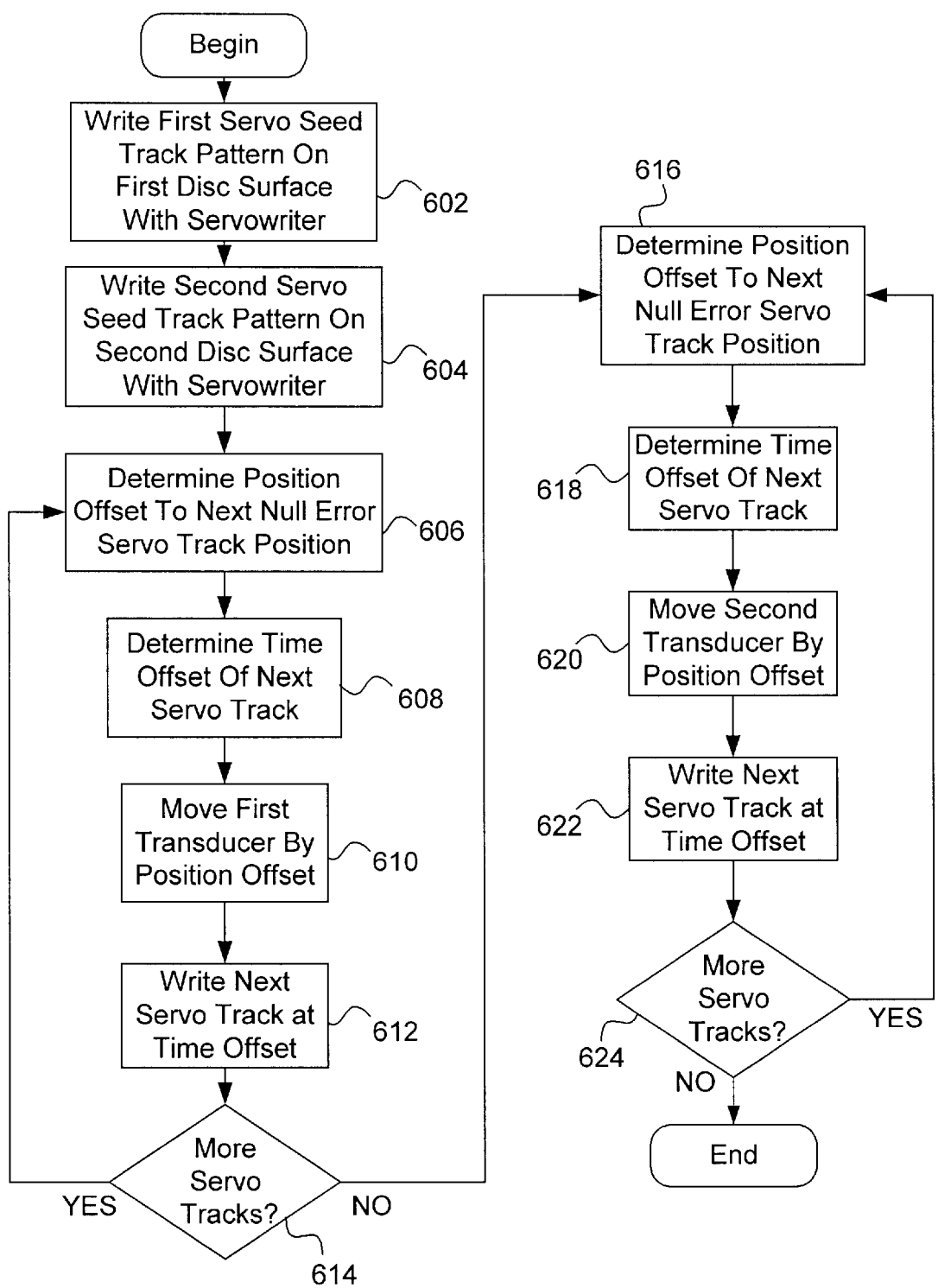
FIG. 6 shows another operational flow diagram of the present invention for propagating servo tracks.

In FIG. 6, an operational flow diagram of another embodiment of the present invention using Extended Copying with Head Offset (ECHO) servo track self-propagation is shown. ECHO servo track writing is described in detail in "Servo Track Writing Using Extended Copying With Head Offset," U.S. patent application Ser. No. 09/756,952.

The operational flow begins with write operation 602, where a first servo seed track pattern is written on the first disc surface using an external servo writer. Next, at write operation 604, a second servo seed track pattern is written on the second disc surface with the servo writer. In this manner, both disc surfaces contain servo seed track patterns from which servo tracks are propagated. Furthermore, it is contemplated that the first servo seed track pattern and the second servo seed track pattern are written at radially opposite positions of the data disc. Thus, if the first servo seed track pattern is written proximate the outer diameter of the disc, the second servo seed track pattern is written proximate the inner diameter of the disc.

Next, at determining operation 606, a position offset from the current write element position to a next null error servo track position is calculated. Upon completion of determining operation 502, operational flow passes to determining operation 608. At determining operation 608, a time offset is calculated for the next servo track to be written.

Next, at moving operation 610, the first transducer is displaced by the position offset distance to the location of the next servo track to be written. The direction of displacement is governed by the position of the read element with respect to the write element. As discussed earlier, servo track self-propagation requires that the transducer head be moved in a direction that the write element leads the read element. Once the transducer head is moved to the appropriate position, control passes to writing operation 612.

At writing operation 612, the next servo track is written to the first disc surface at the time offset calculated above using the write element of the first transducer head. Next, at decision operation 614, the operation flow determines if more servo tracks need to be propagated along the first disc surface. If more tracks need to be written on the first disc surface, control flow is returned to determining operation 606. As discussed earlier, the number of servo tracks propagated on a disc surface may be determined by a servo track count limit or a travel distance limit. If no more servo tracks need to be propagated along the first disc surface, control flow branches to determining operation 616, where propagation of servo tracks along the second disc surface is started.

Determining operation 616 is similar in function to determining operation 606 in that a position offset from the current write element position to a next null error servo track position is calculated for a second transducer head associated with the second disc surface. After determining operation 616 is completed, determining operation 618 calculates a time offset for the next servo track to be written. Upon completion of determining operation 618, control is passed to moving operation 620.

At moving operation 620, the second transducer head is displaced across the second disc surface by the position offset distance. As mentioned above, the direction of servo propagation for the second disc surface is opposite to the direction of servo propagation for the first disc surface. Thus, the moving operation 620 displaces the second transducer head in a direction opposite to the displacement direction in moving operation 610. Next, at writing operation 622, the next servo track is written to the second disc surface at a time synchronized to the time offset calculated above. Control is then transferred to decision operation 624.

At decision operation 624, the operation flow again determines if more servo tracks need to be propagated. If more tracks need to be written on the second disc surface, control flow is returned to determining operation 616. If no more servo tracks need to be propagated along the second disc surface, the process is completed and the ECHO servo track writing procedure is ended.

In summary, and in view of the foregoing discussion, it will be understood that one embodiment of the present invention provides a data storage device (such as 100) comprising a data storage disc (such as 108) having a first disc surface (such as 306) and second disc surface (such as 316). The data storage device (such as 100) also includes an actuator assembly (such as 110) configured to selectively position a first transducer (such as 302) over the first disc surface (such as 306) and a second transducer (such as 312) over the second disc surface (such as 316). Furthermore, the first transducer (such as 302) is substantially identical to the second transducer (such as 312).

In another embodiment of the present invention, the first transducer (such as 302) may include a read element (such as 308) and a write element (such as 310), wherein the read element (such as 308) is offset from the write element (such as 310) along a line of radius from the axis of rotation of the disc by at least the width of one servo track (such as 202). In anther embodiment, the read element (such as 308) is offset from the write element (such as 310) a distance great enough to prevent a zero virtual offset while the first transducer (such as 302) is positioned over the first disc surface (such as 306).

Another embodiment of the invention includes an actuator assembly (such as 110) for reading and writing data from and to a data storage disc (such as 108), with the data storage disc (such as 108) having an inner diameter (such as 136), a first disc surface (such as 306) and a second disc surface (such as 316). The actuator assembly (such as 110) comprises a first transducer (such as 302) coupled with the actuator assembly (such as 110). A first read element (such as 308) is mounted on the first transducer (such as 302), with the first read element (such as 308) configured to read data from the first disc surface (such as 306). A first write element (such as 310) is also mounted on the first transducer (such as 302), with the first write element (such as 310) configured to write data to the first disc surface (such as 306). In addition, the first read element (such as 308) is offset from the first write element (such as 310) by at least the width of one servo track (such as 210), and the first read element (such as 308) is positioned closer to the inner diameter (such as 136) than the first write element (such as 310) when the first transducer (such as 302) is over the first disc surface (such as 306). The actuator assembly (such as 110) further includes a second transducer (such as 312) coupled with the actuator assembly (such as 110). A second read element (such as 318) is mounted on the second transducer (such as 312), with the second read element (such as 318) configured to read data from the second disc surface (such as 316). A second write element (such as 320) is also mounted on the second transducer (such as 312) and is configured to write data to the second disc surface (such as 316). The second read element (such as 318) is offset from the second write element (such as 320) by at least the width of one servo track (such as 210). Furthermore, the second write element (such as 320) is positioned closer to the inner diameter (such as 136) than the second read element (such as 318) when the second transducer (such as 312) is over the second disc surface (such as 316).

In one embodiment of the actuator assembly (such as 110), the distance between the first read element (such as 308) and the first write element (such as 310) is substantially equal to the distance between the second write element (such as 320) and second read element (such as 318). Moreover, the first transducer (such as 302) may be substantially identical to the second transducer (such as 312). In another embodiment of the present invention, the first read element (such as 308) is offset from the first write element (such as 310) a distance great enough to prevent a zero virtual offset while the first transducer (such as 302) is positioned over the first disc surface (such as 306).

Another embodiment of the invention includes a method for writing servo tracks (such as 202) on a data storage disc (such as 108) having a first disc surface (such as 306) and a second disc surface (such as 316), wherein the first disc surface (such as 306) and the second disc surface (such as 316) are bounded by an inner diameter (such as 136) and an outer diameter (such as 138). The method includes a propagating operation (such as 504) for propagating a first servo seed track pattern radially along the first disc surface (such as 306) from a first start position (such as 404) to a first end position (such as 406) in a first direction (such as 410). The method also includes another propagating operation (such as 508) for propagating a second servo seed track pattern along the second disc surface (such as 316) from a second start position (such as 416) to a second end position (such as 418) in a second direction (such as 414) opposite to the first direction (such as 410).

In another embodiment of the method, a writing operation (such as 502) for writing the first servo seed track pattern on the first disc surface (such as 306) using a servowriter is also performed. Another writing operation for writing the second servo seed track pattern on the second disc surface (such as 316) using a servowriter may also be executed. Moreover, the operation of writing the first servo seed track pattern may further include writing the first servo seed track pattern proximate the inner diameter (such as 136), and the operation of writing the second servo seed track pattern may further include the step of writing the second servo seed track pattern proximate the outer diameter (such as 138).

In yet another embodiment of the method, the propagating step includes the operation of referencing the first end position (such as 406) to obtain the second start position (such as 416). The propagating operations (such as 504 and 508) may further include a determining operation (such as 606) for determining a position offset (such as 214) to a next null error write position; a displacing operation (such as 610) for displacing a transducer (such as 118) by the position offset (such as 212); a writing operation (such as 612) for writing a new servo track at the next null error write position; and a repeating operation (such as 614) for repeating these operations until the end position (such as 406) is reached. The method may further comprise a determining operation (such as 608) for determining a time offset (such as 214) at the next null error write position. In addition, the operation of writing a new servo track further comprises a synchronizing operation (such as 612) for synchronizing the new servo track with the time offset (such as 214). In yet another embodiment of the method, the first direction (such as 410) may be from the outer diameter (such as 138) to the inner diameter (such as 136), or from the inner diameter (such as 136) to the outer diameter (such as 138).

Another embodiment of the invention includes a disc drive (such as 100) including a data disc (such as 108) with a first disc surface (such as 306) and a second disc surface (such as 316), where the data disc (such as 108) has at least one servo seed track pattern. The disc drive (such as 100) further includes means for propagating the servo seed track pattern along the first disc surface (such as 306) in a first direction (such as 410) and propagating the servo seed track pattern along the second disc surface in a second direction (such as 414) opposite the first direction (such as 410).

It will be clear that the present invention is well adapted to attain the ends and advantages mentioned, as well as those inherent therein. While the presently preferred embodiments have been described for purposes of this disclosure, various changes and modifications may be made which are well within the scope of the present invention. For example, the present invention may be adapted for use in an optical disc drive configuration, such as a Compact Disk (CD) or Digital Versatile Disk (DVD). Thus numerous other changes, combinations, and arrangements of techniques may be made which will readily suggest themselves to those skilled in the art and which are encompassed in the spirit of the invention disclosed and as defined in the appended claims.

What is claimed is:

1. A method of making a disc drive comprising a disc having a center axis, the method comprising steps of:
   (a) making a first head having a first read element and a first write element;
   (b) making a second head substantially identical with the first head, the second head having a second read element and a second write element;
   (c) supporting the first head with a first actuator arm so that the first read and write elements have respective offset distances R1 and W1 from the center axis so that |R1−W1|>D>0 while the first head is positioned adjacent the disc, where D is equal to a typical servo track width;
   (d) supporting the second head with a second actuator arm so that the second read and write elements have respective offset distances R2 and W2 from the center axis so that |R2−W2|>D>0 while the second head is positioned adjacent the disc; and
   (e) during one rotation of the disc, controlling the motion of the first write element with a signal received from the first read element.

2. The method of claim 1 in which the controlling step (e) further comprises steps of:
   (e1) writing a first servo track with the first write element;
   (e2) subsequently reading several position-indicative values from the first servo track;
   (e3) deriving a control signal from the several position-indicative values; and
   (e4) providing the control signal to a motor configured to control the first actuator arm while the first write element writes a second servo track.

3. The method of claim 2 in which steps (a) through (d) are performed so that R1+R2 is about equal to W2+W2 throughout the first and second actuator arms' ranges of motion, further comprising steps of:
   (f) self-writing several thousand servo tracks with the first actuator arm progressing in a first direction; and
   (g) self-writing several thousand servo tracks with the second actuator arm progressing in a second direction opposite to the first direction.

4. The method of claim 1, further comprising a step of writing several thousand servo tracks each servo track having an average width less than D/2.

5. The disc drive made by the method of claim 1 comprising:
   a stack of at least two discs configured to rotate about the center axis, one of which is the disc;
   several substantially identical heads, two of which being the first and second heads;
   the first actuator arm supporting the first head so that the first read element and the first write element are never offset from the axis by an equal amount; and
   the second actuator arm supporting the second head so that the second read element and second first write element are never offset from the axis by an equal amount.

6. A disc drive comprising:
   a disc having a center axis;
   at least a first and a second substantially identical heads, each head having a write element and a read element; and
   the first and second heads supported so that the read element is radially offset from the write element in each of the heads in opposite directions on opposite sides of the disc.

7. The disc drive of claim 6 in which the disc includes first and second opposing data surfaces, each data surface having an inner diameter, the read and write elements of the first head configured to interact with the first data surface, the read and write elements of the second head configured to interact with the second data surface, in which the first read element is closer to the inner diameter than the first write element, and in which the second write element is closer to the inner diameter than the second read element so as to facilitate a serpentine servo track writing operation.

8. A method for writing servo tracks on a data storage disc, the data storage disc having a first disc surface and a second disc surface, wherein the first disc surface and the second disc surface are bounded by an inner diameter and an outer diameter, the method comprising steps of:

(a) propagating a first servo seed track pattern radially along the first disc surface from a first start position to a first end position in a first direction; and (b) propagating a second servo seed track pattern along the second disc surface from a second start position to a second end position in a second direction opposite to the first direction.

9. The method of claim 8, further comprising the step of writing the first servo seed track pattern on the first disc surface using servo writing propagation.

10. The method of claim 9, further comprising the step of writing the second servo seed track pattern on the second disc surface using servo writing propagation.

11. The method of claim 10, wherein the step of writing the first servo seed track pattern further includes the step of writing the first servo seed track pattern proximate the inner diameter; and wherein the step of writing the second servo seed track pattern further includes the step of writing the second servo seed track pattern proximate the outer diameter.

12. The method of claim 8, wherein the propagating step (b) further comprises the step of referencing the first end position to obtain the second start position.

13. The method of claim 8, wherein each of the propagating steps (a) and (b) further comprises steps of:

(1) determining a position offset to a next null error write position;

(2) displacing a head by the position offset;

(3) writing a new servo track at the next null error write position; and (4) repeating the steps (1), (2) and (3) until the end position is reached.

14. The method of claim 11, further comprising the step of determining a time offset at the next null error write position; and wherein the step of writing a new servo track further comprises synchronizing the new servo track with the time offset.

15. The method of claim 8, wherein the first direction is from the outer diameter to the inner diameter.

16. The method of claim 8, wherein the first direction is from the inner diameter to the outer diameter.

* * * * *

UNITED STATES PATENT AND TRADEMARK OFFICE
CERTIFICATE OF CORRECTION

PATENT NO. : 6,724,558 B2
DATED : April 20, 2004
INVENTOR(S) : Lawrence Matthias Bryant, Karl Arnold Belser and Robert Dale Murphy It is certified that error appears in the above-identified patent and that said Letters Patent is hereby corrected as shown below:

Title page,
Item [73], Assignee, replace "JPMorgan Chase Bank, New York, NY (US)" with
-- Seagate Technology LLC, Scotts Valley, CA (US) --.

Signed and Sealed this

Twenty-seventh Day of July, 2004

JON W. DUDAS
*Acting Director of the United States Patent and Trademark Office*